United States Patent [19]

Fiacco et al.

[11] Patent Number: 6,098,125
[45] Date of Patent: Aug. 1, 2000

[54] METHOD OF MAPPING FIBRE CHANNEL FRAMES BASED ON CONTROL AND TYPE HEADER FIELDS

[75] Inventors: Peter Fiacco, Yorba Linda; Bradley Roach, Newport Beach; Karl M. Henson, Rancho Santa Margarita, all of Calif.

[73] Assignee: California Institute of Technology, Pasadena, Calif.

[21] Appl. No.: 09/071,276

[22] Filed: May 1, 1998

[51] Int. Cl.[7] ................................................ G06F 13/00
[52] U.S. Cl. ........................... 710/52; 709/230; 709/236; 709/245; 710/5; 710/38; 710/53; 370/235; 370/453; 370/462
[58] Field of Search ................................. 710/30, 31, 38, 710/5, 52, 53; 714/5, 29; 370/235, 418, 453, 462; 386/68; 709/236, 245, 230

[56] References Cited

U.S. PATENT DOCUMENTS

| | | | |
|---|---|---|---|
| 5,029,164 | 7/1991 | Goldstein et al. | 370/235 |
| 5,271,009 | 12/1993 | Takano et al. | 370/473 |
| 5,291,486 | 3/1994 | Koyanagi | 370/541 |
| 5,404,361 | 4/1995 | Casorso et al. | 714/767 |
| 5,495,580 | 2/1996 | Osman | 713/201 |
| 5,522,047 | 5/1996 | Grow et al. | 709/251 |
| 5,524,258 | 6/1996 | Corby, Jr. et al. | 712/19 |
| 5,553,302 | 9/1996 | Morrissey et al. | 710/5 |
| 5,598,541 | 1/1997 | Malladi | 710/106 |
| 5,600,795 | 2/1997 | Du | 709/227 |
| 5,638,512 | 6/1997 | Osman et al. | 713/201 |
| 5,659,718 | 8/1997 | Osman et al. | 710/129 |
| 5,724,358 | 3/1998 | Headrick et al. | 370/418 |
| 5,734,652 | 3/1998 | Kwok | 370/395 |
| 5,768,530 | 6/1998 | Sandorfi . | |
| 5,784,380 | 7/1998 | Kuwahara | 370/509 |
| 5,809,328 | 9/1998 | Nogales et al. | 710/5 |
| 5,852,809 | 12/1998 | Abel et al. | 705/26 |
| 5,881,242 | 3/1999 | Ku et al. . | |
| 5,923,812 | 7/1999 | Sakazaki et al. | 386/68 |
| 5,936,956 | 8/1999 | Naven | 370/395 |
| 5,956,473 | 9/1999 | Ma et al. | 714/5 |
| 6,014,383 | 1/2000 | McCarty | 370/453 |
| 6,038,235 | 3/2000 | Ho et al. | 370/462 |

OTHER PUBLICATIONS

Fiber Channel Tutorial, http://www.fibrechannel.com/technology/tutorial.htm.

Fibre Channel Overview, http://www.cern.ch/HSI/fcs/spec/overview.htm.

Fibre Channel Glossary, http://www.iol.unh.edu/training/fc/fcglossary.html.

*Primary Examiner*—Thomas C. Lee
*Assistant Examiner*—Tammara Peyton
*Attorney, Agent, or Firm*—Fish & Richardson P.C.

[57] ABSTRACT

A method and apparatus for processing and transferring frames of data in a computer data link that maps incoming frames to a specific buffer ring in host memory based on routing control and type fields in each frame. More particularly, a Fibre Channel link port contains receiver routing code (RRCode) registers that allow host software to set up routing control (R_CTL) match and mask fields, and TYPE match and mask fields. The link port uses these registers to match and mask against corresponding R_CTL/TYPE fields in a received frame to determine which of several R_CTL/TYPE host memory buffer rings should be used to store the received frame. The link port places a code (RRCode) in a start of frame (SOF) status word associated with a frame. The RRCode indicates a specific R_CTL/TYPE host memory buffer ring, or indicates that no match was found or that multiple matches were found. A protocol engine reads the RRCode field in the SOF status word of the received frame, and queues a direct memory access (DMA) operation to an appropriate R_CTL/TYPE buffer ring. The host may then process the contents of the indicated buffer ring. Since the buffer rings are "pre-sorted" as to frame type, the host may more efficiently respond to incoming frames.

14 Claims, 6 Drawing Sheets

METHOD OF MAPPING FIBRE CHANNEL FRAMES BASED ON CONTROL AND TYPE HEADER FIELDS

TECHNICAL FIELD

This invention relates to computer networks, and more particularly to processing and transmitting sequences of frames by mapping frames based on control and type header fields.

BACKGROUND

The number of computers and peripherals has mushroomed in recent years. This has created a need for improved methods of interconnecting these devices. A wide variety of networking paradigms have been developed to enable different kinds of computers and peripheral components to communicate with each other.

There exists a bottleneck in the speed with which data can be exchanged along such networks. This is not surprising because increases in network architecture speeds have not kept pace with faster computer processing speeds. The processing power of computer chips has historically doubled about every 18 months, creating increasingly powerful machines and "bandwidth hungry" applications. It has been estimated that one megabit per second of input/output is generally required per "MIPS" (millions of instructions per second) of processing power. With CPUs now easily exceeding 200 MIPS, it is difficult for networks to keep up with these faster speeds.

Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and high reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications such as uncompressed, full motion, high-quality video.

There are generally three ways to deploy Fibre Channel: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", yield the highest performance by leveraging the benefits of cross-point switching.

The Fibre Channel fabric works something like a traditional phone system. The fabric can connect varied devices such as work stations, personal computers (PCs), servers, routers, mainframes, and storage devices that have Fibre Channel interface ports. Each such device can have an origination port that "calls" the fabric by entering the address of a destination port in a header of a frame. The Fibre Channel specification defines the structure of this frame. (This frame structure raises data transfer issues that will be discussed below and addressed by the present invention). The Fibre Channel fabric does all the work of setting up the desired connection, hence the frame originator does not need to be concerned with complex routing algorithms. There are no complicated permanent virtual circuits (PVCs) to set up. Fibre Channel fabrics can handle more than 16 million addresses and thus, are capable of accommodating very large networks. The fabric can be enlarged by simply adding ports. The aggregate data rate of a fully configured Fibre Channel network can be in the tera-bit-per-second range.

Each of the three basic types of Fibre Channel connections are shown in FIG. 1, which shows a number of ways of using Fibre Channel technology. In particular, point-to-point connections 100 are shown connecting mainframes to each other. A Fibre Channel arbitrated loop 102 is shown connecting disk storage units. A Fibre Channel switch fabric 104 connects work stations 106, mainframes 108, servers 110, disk drives 112, and local area networks (LANs) 114. Such LANs include, for example, Ethernet, Token Ring and fibre distributed data interface (FDDI) networks.

An ANSI specification (X3.230-1994) defines the Fibre Channel network. This specification distributes Fibre Channel functions among five layers. As shown in FIG. 2, the five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

While the Fibre Channel operates at a relatively high speed, it would be desirable to increase speeds further to meet the needs of faster processors. One way to do this would be to eliminate, or reduce, delays that occur at interface points. One such delay occurs during the transfer of a frame from the FC-1 layer to the FC-2 layer. At this interface, devices linked by a Fibre Channel data link receive Fibre Channel frames serially. A protocol engine (PENG) receives each frame and processes them at the next layer, the FC-2 layer shown in FIG. 2. The functions of the protocol engine include validating each frame; queuing up direct memory access (DMA) operations to transfer each frame to the host; and building transmit frames.

Fibre Channel frames come in several types. Each frame includes a header and a payload portion. One part of the frame header is a routing control and type (R_CTL/TYPE) field that provides an indication of frame type and routing information. (The R_CTL/TYPE field may be implemented as separate routing and type fields). Fibre Channel networks can recognize and handle TCP/IP frames compatible with the Internet. TCP/IP frames include link control frames and data frames, each identified by the R_CTL/TYPE field within its respective frame header. TCP/IP frames generally need to be processed differently from other types of Fibre Channel frames. In particular, TCP/IP frames may require a response from a host processor within a certain amount of time, or an error condition occurs.

Conventional approaches to handling frames generally rely on the involvement of a host CPU on a frame-by-frame basis. For example, validation of received frames and setting up DMA operations and acknowledgments typically involve the host CPU, which limits frame transmission and reception rates and prevents the host CPU from performing other tasks. Further, a host CPU with software protocol "stacks" may have difficulty keeping up with fast networks such as Fibre Channel.

In typical Fibre Channel host adapters, frame routing functions are performed by an on-board microprocessor.

However, in low-cost implementations, the microprocessor-based products will be replaced with products that use dedicated hardware or sequencer-based solutions. In these solutions, the on-board processors do not have enough computing power to process the R_CTL/TYPE fields within frames, so frames must be passed to host memory for processing. Time spent by the host in sorting out frame types may cause undue delay in responding to incoming requests.

In view of the foregoing, objects of the invention include: increasing data transfer processing speeds in high speed networks such as the Fibre Channel network; providing a technique that can speed up a protocol engine's processing of data frames; minimizing data traffic between a protocol engine and a host CPU and system memory; performing Fibre Channel frame routing in hardware; and improving host software efficiency by using hardware to perform routing on specific types of frames, and more particularly to perform an initial mapping of frames into specific host-based rings based on the R_CTL/TYPE field.

SUMMARY

The invention is directed to processing and transferring frames of data in a computer data link. In a preferred implementation, the invention allows a Fibre Channel protocol engine to map incoming frames to a specific buffer ring in host memory based on routing control and type fields in each frame.

More particularly, a Fibre Channel link (NL-Port) in accordance with the invention contains receiver routing code (RRCode) registers that allow host software to set up routing control (R_CTL) match and mask fields, and TYPE match and mask fields. The NL-Port uses these registers to match and mask against corresponding R_CTL/TYPE fields in a received frame to determine which of several R_CTL/TYPE host memory buffer rings should be used to store the received frame. In the preferred embodiment, the NL-Port places a 3-bit code (RRCode field) in a start of frame (SOF) status word associated with a frame. The RRCode indicates a specific R_CTL/TYPE host memory buffer ring, or indicates that no match was found or that multiple matches were found.

A protocol engine (PENG) reads the RRCode field in the SOF status word of the received frame, and queues a direct memory access (DMA) operation to an appropriate R_CTL/TYPE buffer ring. The PENG "pulls" a buffer list entry (BLE) for the indicated R_CTL/TYPE buffer ring, which indicates the current starting address and length for a storage location in host memory. Next, the PENG writes the header and/or payload of the received frame into the host memory referenced by the indicated buffer list entry. Finally, the PENG posts a response to the host driver when the write operation is complete. The host may then process the contents of the indicated buffer ring. Since the buffer rings are "pre-sorted" as to frame type, the host may more efficiently respond to incoming frames.

Advantages of the invention include: improved host software efficiency; higher speed receive frame processing; and faster routing of received frames by using hardware to perform routing to host buffer rings associated with specific types of frames.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

The invention improves host software efficiency in part by using hardware to perform routing on specific types of frames. When implemented as part of a Fibre Channel network architecture, the invention uses routing control/type (R_CTL/TYPE) fields in a Fibre Channel frame header to map incoming receive frames to a specific ring of buffers in host memory.

Figure 1:
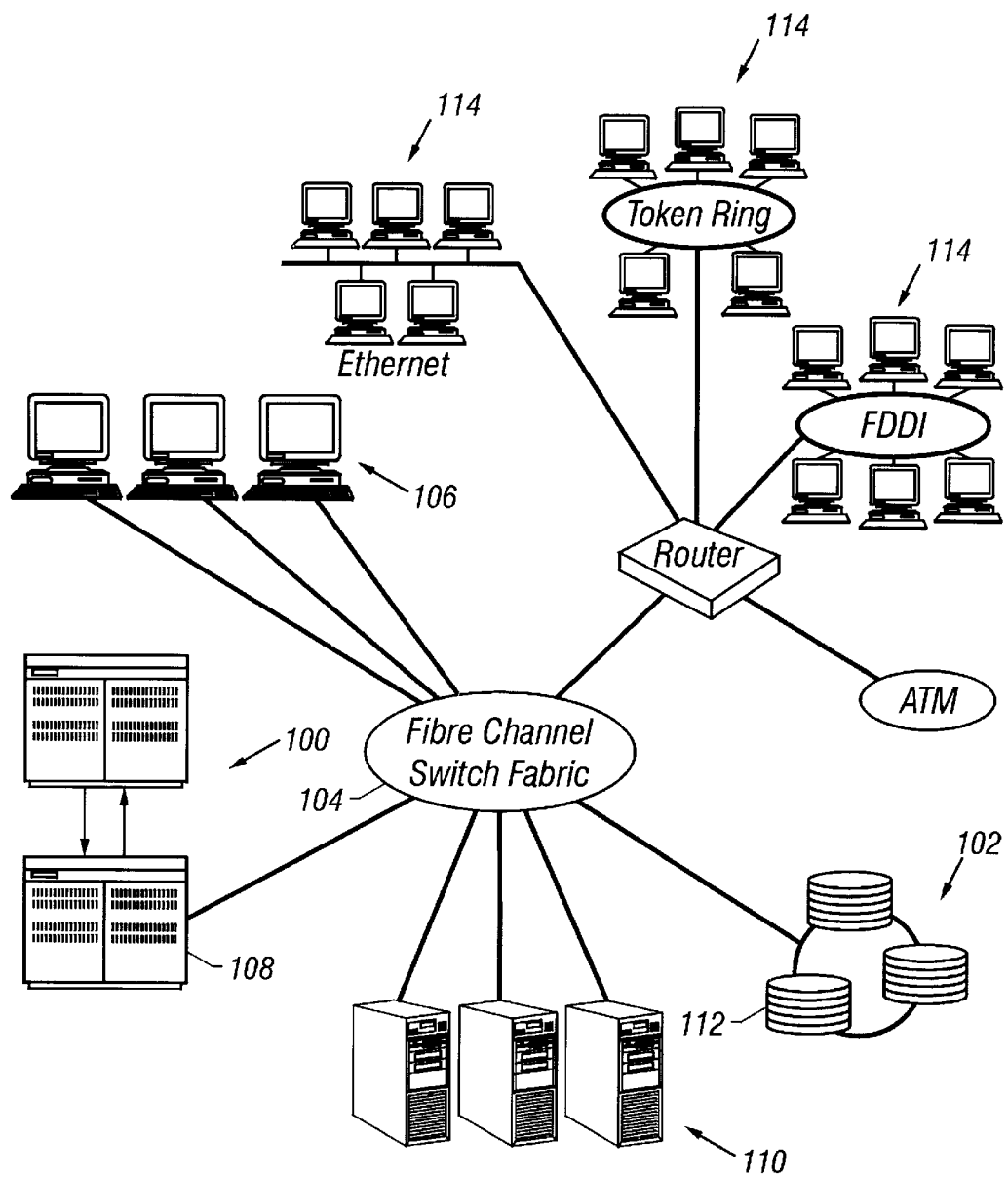
FIG. 1 is a block diagram of a prior art complex computer network utilizing Fibre Channel technology.
Figure 2:
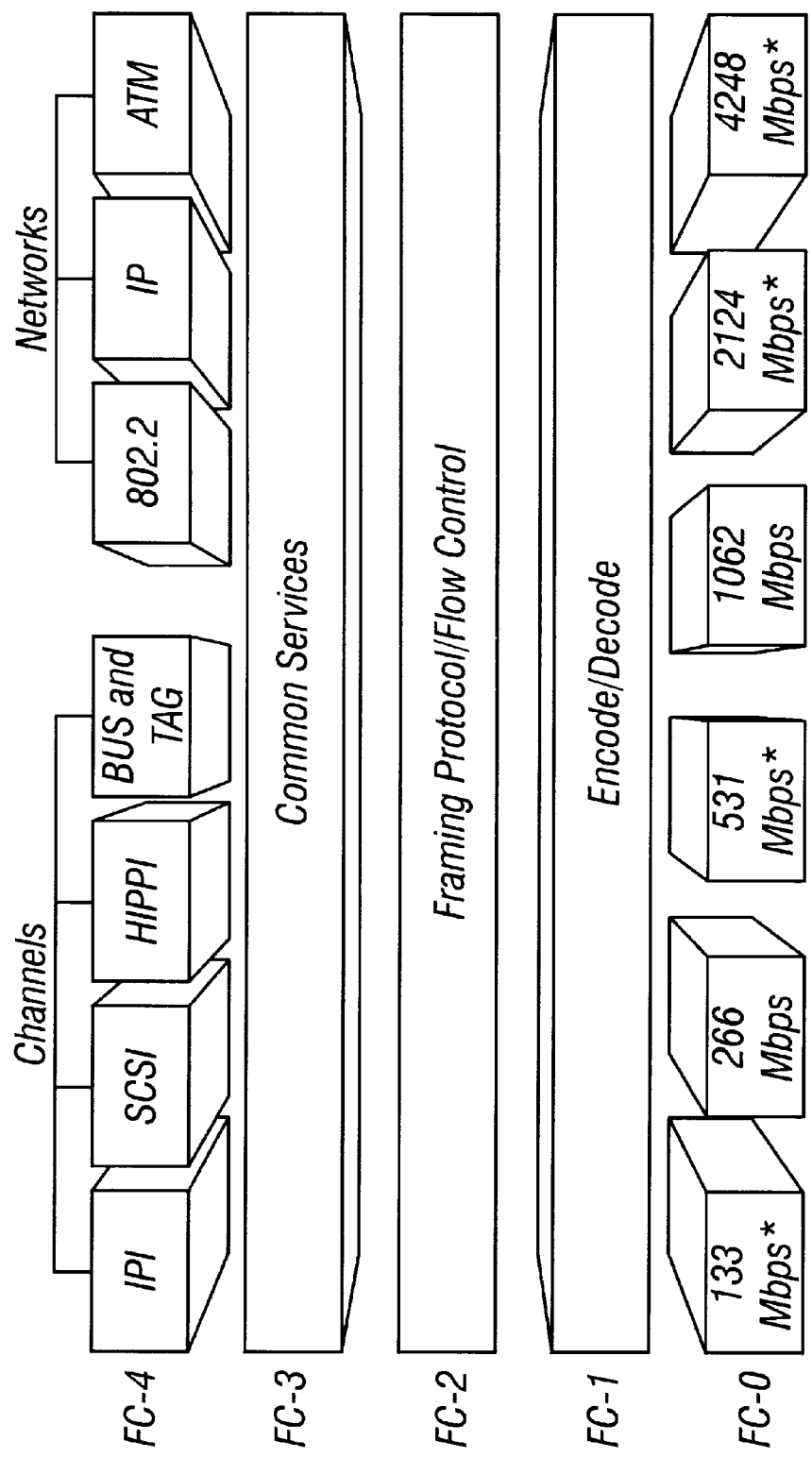
FIG. 2 is a diagram of the five functional layers of the prior art Fibre Channel standard.
Figure 3:
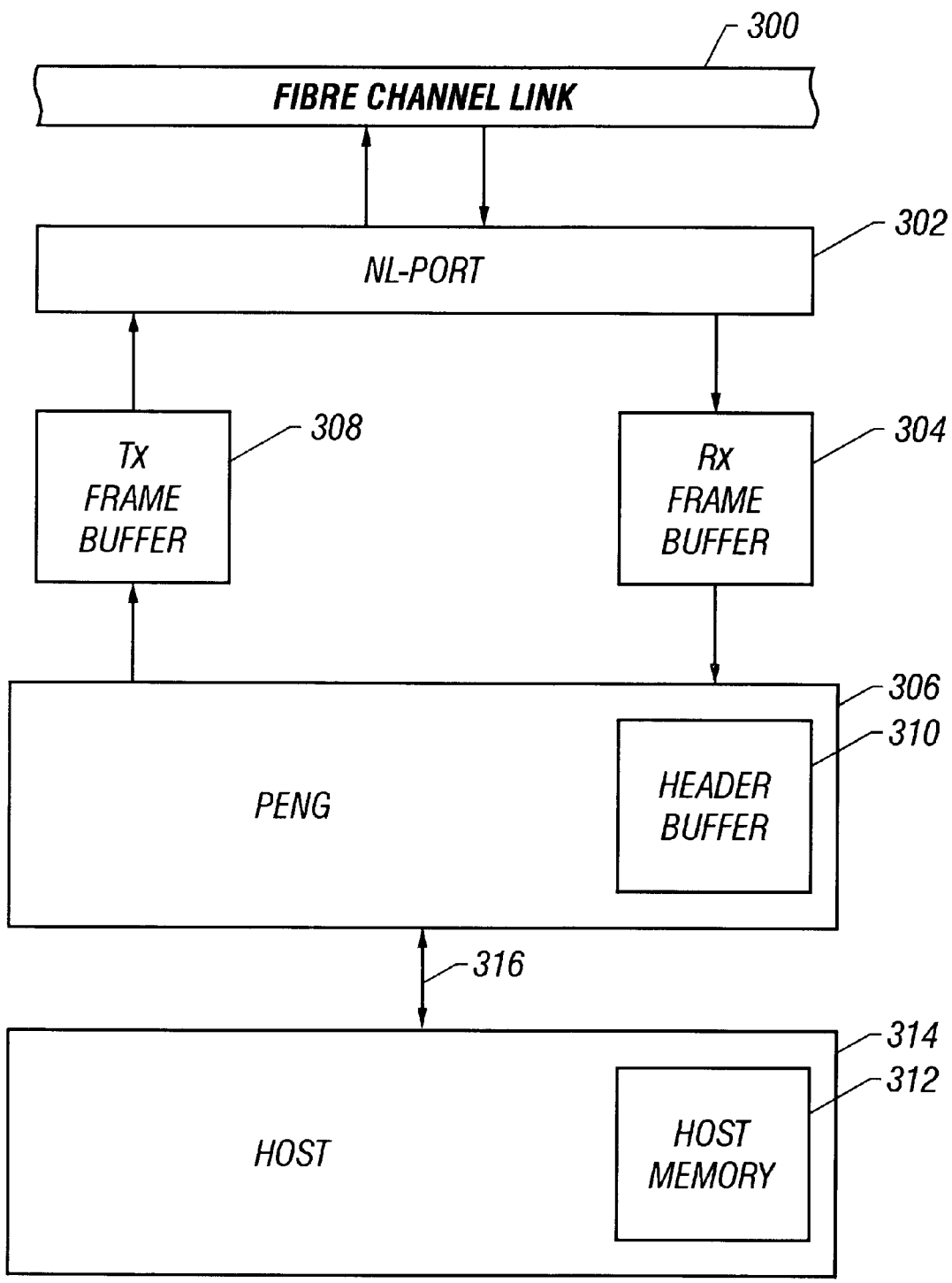
FIG. 3 is a block diagram of a preferred communication processing system in accordance with the invention.

FIG. 3 shows a preferred communication processing system that is adapted for use with a Fibre Channel network. Serial data is received along a Fibre Channel data link 300. Frames received from the data link 300 are processed by an NL-Port 302 which decodes and parallelizes the incoming serial data into words and then assembles the words into frames, in known fashion.

Frames generally will include three portions: a preamble, a data or "payload" portion, and a trailer portion. In a Fibre Channel data link, for example, a frame includes a start of frame (SOF) word (four bytes); a data portion including a frame header (24 bytes), between zero and 2112 payload bytes, and a cyclical redundancy check (CRC) word (4 bytes); and an end of frame (EOF) word (4 bytes). The frame header is used to control link applications, control device protocol transfers, and detect missing or out of order frames. The CRC word indicates whether there is a problem in the transmission, such as a data corruption, or whether some part of the frame was dropped during transmission.

The NL-Port 302 also checks the CRC word for each frame received and adds a resulting "good-bad" CRC status indicator to other status information bits within an EOF status word that is generated from the EOF word. The NL-Port 302 then writes each frame into a receive frame FIFO buffer 304. Further details of a preferred receive frame FIFO buffer module 304 are described in a co-pending U.S. patent application entitled "RECEIVE FRAME FIFO WITH END OF FRAME BYPASS", Ser. No. 08/935,898, filed on Sep. 23, 1997, and assigned to the same assignee of the present invention, the disclosure of which is incorporated by reference.

Frames are then received by a full-duplex communication processor, also referred to as a protocol engine (PENG), 306. Several functions are performed by the PENG 306, including: 1) queuing up a host command to write data in a received frame into a host memory 312 of a processor 314 through a direct memory access (DMA) channel 316; 2) validating the frame header to ensure that the frame is the next logical frame that should be received; 3) determining whether the frame is defective or not; and 4) generating transmit frames in response to a received frame or host-generated transmit command.

The PENG 306 validates frame headers within a PENG buffer 310 as such headers are received from the receive frame FIFO buffer 304. The PENG 306 also builds transmit frames and sends them to the data link 300 through a transmit frame FIFO buffer 308. The NL-Port 302, receive frame FIFO buffer 304, and PENG 306 can be implemented on a single chip, such as an application specific integrated circuit (ASIC). Further details of a preferred PENG 306 are described in a co-pending U.S. patent application entitled "FULL-DUPLEX COMMUNICATION PROCESSOR", Ser. No. 08/937,066, U.S. Pat. No. 6,005,849 filed on Sep. 24, 1997, and assigned to the same assignee of the present invention, the disclosure of which is incorporated by reference. For information about frame validation, see the co-pending U.S. patent application entitled "METHOD OF VALIDATION AND HOST BUFFER ALLOCATION FOR UNMAPPED FIBRE CHANNEL FRAMES", Ser. No. 09/048,930, filed on Mar. 26, 1998, still pending and assigned to the same assignee of the present invention, the disclosure of which is incorporated by reference.

Register Matching & Masking

Figure 4:
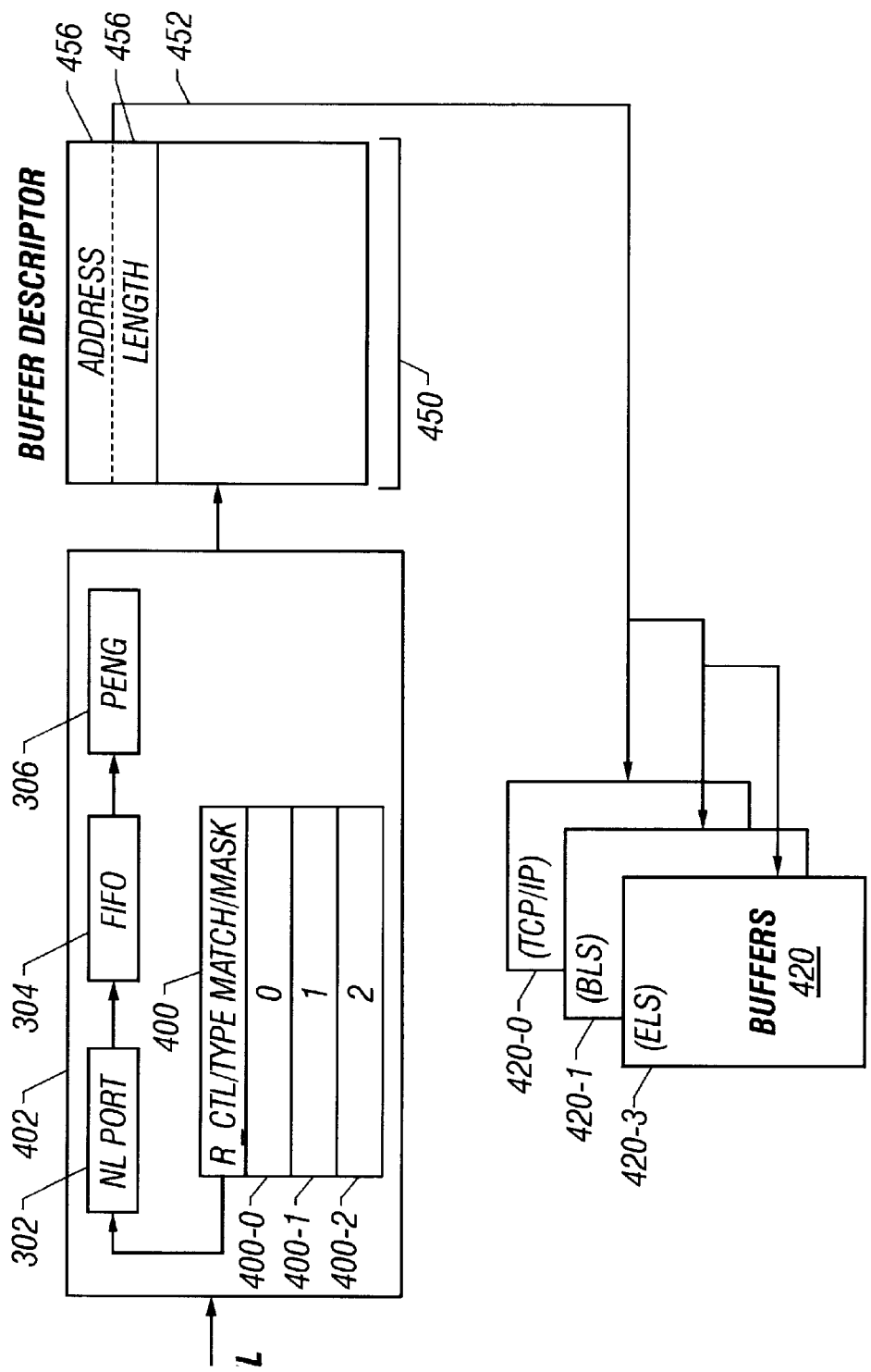
FIG. 4 is a block diagram of register and buffer interaction in a preferred communication processing system in accordance with the invention.

FIG. 4 is a block diagram of register and buffer interaction in a preferred communication processing system in accordance with the invention. In the preferred embodiment, an NL-Port 302 302, receive frame FIFO buffer 304, protocol engine PENG 306, and a set of match and mask receiver routing code ("RRCode") Registers 400 are implemented in a single integrated circuit 402. The RRCode Registers 400 are coupled to the NL-Port 302. For example, the RRCode Registers 400 may include three 32-bit registers 400-0, 400-1, and 400-2 for RRCode storage.

Each RRCode Register 400-0, 400-1, and 400-2 can store field values defining a TYPE Match, a TYPE Mask, a R_CTL Match, and a R_CTL Mask. The contents of these fields can be compared to corresponding fields in a received frame. In this way, RRCodes can be defined to match on multiple TYPE values and/or multiple R_CTL values and their combinations. In a typical embodiment, each match or mask field of the RRCode Registers is 8 bits. Mask bits indicate which corresponding bits in the R_CTL and TYPE fields of a frame to compare, while the match bits indicate the value to be compared against. For example, a mask value of "10001000" would mean that only bits 3 and 7 (counting from the right, with the least significant bit being position 0) would be compared against a match value.

When the NL-Port 302 receives a frame, the contents of the RRCode Registers 400 are compared to the R_CTL and TYPE fields in each frame. Particular sets of values of the R_CTL and TYPE fields within a frame header define an association between the frame and a particular buffer ring. In the preferred embodiment, there are three R_CTL/TYPE buffer rings: 0, 1, and 2, each corresponding to a RRCode Register 400-0, 400-1, 400-2.

If a match is made between the set of RRCodes Register 400 contents and the R_CTL and TYPE fields of the received frame, the NL-Port 302 generates an RRCode to indicate which buffer ring should be used to store the frame header and/or payload. Other events may be encoded in an RRCode as well. In the preferred embodiment, three bits are used to encode the following outcomes in a single RRCode:

| RRCode | Meaning |
|---|---|
| 000 | No matches found |
| 001 | Matches only RRCode Register 0 |
| 010 | Matches only RRCode Register 1 |
| 011 | Matches only RRCode Register 2 |
| 1xx | Multiple RRCode Registers match |

The generated RRCode is then preferably inserted by the NL-Port 302 into the SOF status word associated with the received frame. Next, the PENG 306 reads the RRCode field in the SOF status word of the received frame, and queues a direct memory access (DMA) operation to an appropriate R_CTL/TYPE buffer ring 420 to store the corresponding frame header and/or payload. In the preferred embodiment, the buffer rings are defined to handle the following associated frame types: a transmission control protocol/Internet protocol (TCP/IP) buffer 420-0, a buffer link services (BLS) buffer 420-1, and an extended link services (ELS) buffer 420-2. In the preferred embodiment, R_CTL/TYPE buffer rings 420 are used to receive all frames except Fibre Channel protocol (FCP) responder frames (i.e. for a locally originated FCP exchange). Frames that yield an RRCode "000" or "1xx" may use a default R_CTL/TYPE buffer ring. Finally, PENG 306 posts a response to the host driver when the frame is stored and the operation is complete.

The segregated R_CTL/TYPE buffer rings 420 assist the host in demultiplexing incoming frames for appropriate driver entry points. The buffer rings preferably are prioritized, with R_CTL/TYPE buffer ring 400-0 having the highest priority, which are processed first by the host. Priority allows for lower priority default R_CTL/TYPE matches. This architecture is particularly well suited to handling higher level protocols, such as TCP/IP, over a Fibre Channel network, since such protocols may require responses from a host in a more timely fashion than other protocols. By prioritizing and categorizing frames by type, a host can be programmed to more quickly respond to certain types of frames sequences.

In a preferred implementation, the R_CTL/TYPE buffer rings 420 preferably are defined by means of a fixed-sized sequential list 450 of buffer descriptors 452. The list 450 is managed by hardware as a logical ring. Buffer descriptors 452 consists of two words: an address 456 that points to the start of an actual storage buffer (preferably on a word boundary), and a length (e.g., a byte count) 456 for the number of words in the buffer. Such indirect definition of buffer rings is known in the art.

Operational Flow

Figure 5:
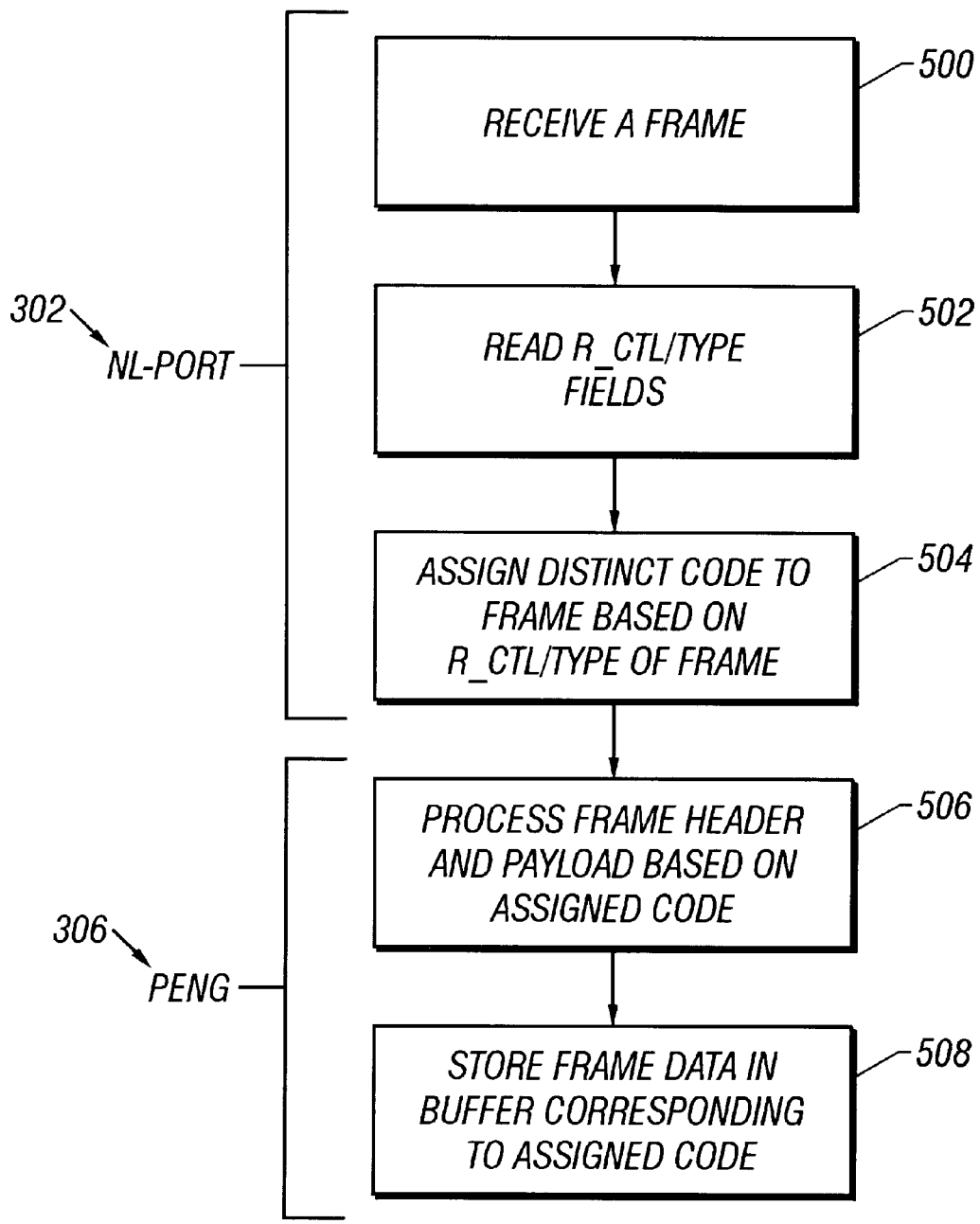
FIG. 5 is a simplified flow chart diagram of mapping frames based on header fields in accordance with a preferred embodiment of the invention.

FIG. 5 is a simplified flow chart of a method of mapping frames based on header fields in accordance with a preferred embodiment of the invention. NL-Port 302 receives a frame from Fibre Channel data link 300 (Step 500) and reads the R_CTL/TYPE fields of the received frame (Step 502). A distinct RRcode is assigned to the frame based on a comparison of the R_CTL/TYPE fields to the contents of the RRCode Registers 400 (Step 504). The frame is sent to the PENG 306 for processing based on the RRCode value (Step 506). In particular, the PENG 306 stores the frame in one of three buffer rings 420 corresponding to the assigned RRCode or in a default buffer ring if the RRCode indicates no match with the RRCode Registers 400 (Step 508).

Figure 6:
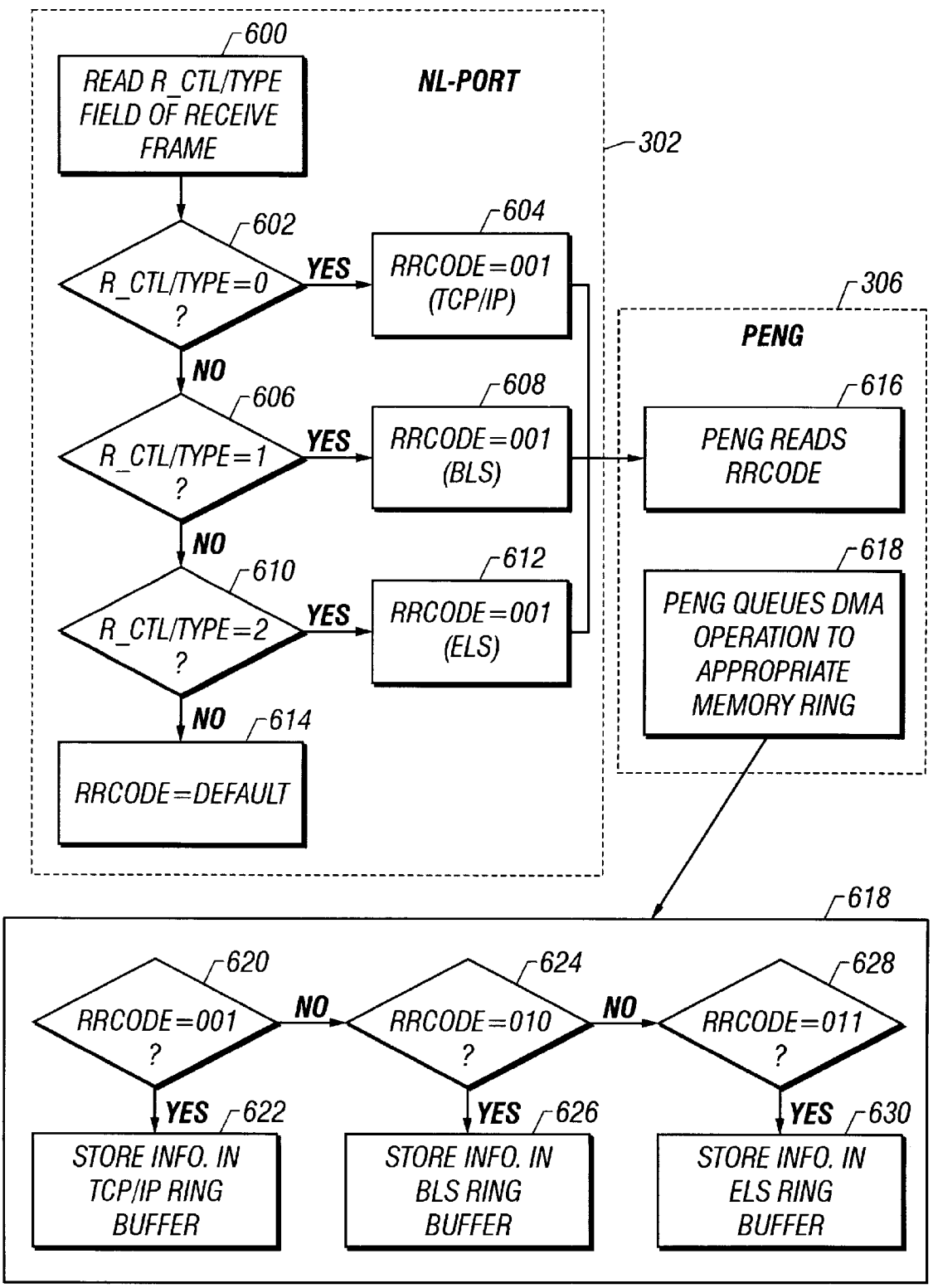
FIG. 6 is a flow chart diagram of mapping frames based on header fields in accordance with the invention.

FIG. 6 shows a more detailed flow chart of a method of mapping Fibre Channel frames based on R_CTL/TYPE header fields in accordance with a preferred embodiment of the invention. More specifically, the NL-Port 302 receives a Fibre Channel frame from the Fibre Channel data link 300 and reads the received frame's R_CTL/TYPE fields (Step 600). If the R_CTL/TYPE fields of the received frame match RRCode Register 400-0 (i.e., indicating a TCP/IP frame) (Step 602), the NL-Port 302 places a 3-bit RRCode in the SOF status word field of the received frame having a value of 001 (Step 604).

However, if the R_CTL/TYPE fields of the received frame match RRCode Register 400-1 (i.e., indicating a BLS frame) (Step 606), the NL-Port 302 places a 3-bit RRCode in the SOF status word field of the received frame having a value of 010 (Step 608).

Alternatively, if the R_CTL/TYPE fields of the received frame match RRCode Register 400-2 (i.e., indicating an ELS frame) (Step 610), the NL-Port 302 places a 3-bit RRCode in the SOF status word field of the received frame having a value of 011 (Step 612).

However, if the value of R_CTL/TYPE field 310 of the received frame does not match one of the three R_CTL/TYPE RRCode Registers 400, the RRCode is set to a default value (preferably 000) that will indicate to the PENG 306 that the frame should be stored in a default R_CTL/TYPE buffer ring (Step 614).

The frame is then sent to PENG 306 for processing based upon the value of the RRCode assigned in the frame's SOF status word field. The PENG 306 reads the assigned RRCode of the received frame (Step 616) and queues a DMA operation to a corresponding buffer ring (Step 618).

In greater detail, Step 618 performs the following functions: if the RRCode of the received frame is equal to "001" (Step 620), the PENG 306 queues a DMA operation to the TCP/IP buffer ring 420-0 (Step 622); if the RRCode of the received frame is equal to "010" (Step 624), the PENG 306 queues a DMA operation to the BLS buffer ring 420-1 (Step 626); if the RRCode of the received frame is equal to "011" (Step 628), the PENG 306 queues a DMA operation to the ELS buffer ring 420-2 (Step 630).

Optionally, if multiple matches are made to the RRCode Registers 400, the RRCode of the received frame is set to a distinctive value, preferably 1xx, where "xx" is any value.

A number of embodiments of the invention have been described. Nevertheless, it will be understood that various modifications may be made without departing from the spirit and scope of the invention. For example, a number of the steps and tests described above may be performed in different sequences and still obtain the same result. Accordingly, other embodiments are within the scope of the following claims.

What is claimed is:

1. A method for mapping frames of varying types received from a network system, comprising the steps of:

(a) receiving a frame, including an associated header and payload;

(b) reading at least one field of the header of the received frame;

(c) comparing each field to at least one corresponding predefined match value;

(d) assigning a code to the received frame based on the results of the comparing;

(e) storing data from the received frame in a buffer corresponding to the code.

2. The method of claim 1, further including the step of masking each field by a predefined corresponding mask value before the step of comparing.

3. The method of claim 1, wherein the network system is a Fibre Channel network.

4. The method of claim 3, wherein the field is a R_CTL/TYPE field.

5. The method of claim 3, wherein at least one frame type is a TCP/IP frame type.

6. The method of claim 1, further including the steps of:

(a) assigning a priority to each buffer;

(b) processing the contents of the buffers based on priority.

7. The method of claim 1, wherein each buffer is a ring buffer.

8. A system for mapping frames of varying types received from a network system, comprising:

(a) a receiver circuit for receiving a frame, including an associated header and payload;

(b) at least one register, each for storing at least one predefined match value;

(c) a comparison circuit, for comparing at least one field of the header of a received frame to each corresponding predefined match value of each register;

(d) a code assignment circuit for assigning a code to the received frame based on the results of the comparing;

(e) a buffer storage system for storing data from the received frame in a buffer corresponding to the code.

9. The system of claim 8, wherein each register stores a predefined mask value associated with each predefined match value, and the comparison circuit masks each field by a corresponding predefined mask value before comparing.

10. The system of claim 8, wherein the network system is a Fibre Channel network.

11. The system of claim 10, wherein at least one field is a R_CTL/TYPE field.

12. The system of claim 10, wherein at least one frame type is a TCP/IP frame type.

13. The system of claim 8, wherein the code is associated with a priority, and the buffer storage system stores data from the received frame based on such priority.

14. The system of claim 8, wherein each buffer is a ring buffer.

* * * * *

UNITED STATES PATENT AND TRADEMARK OFFICE
CERTIFICATE OF CORRECTION

PATENT NO. : 6,098,125
DATED : AUGUST 1, 2000
INVENTOR(S) : BRADLEY ROACH, PETER FIACCO AND KARL M. HENSON

It is certified that error appears in the above-indentified patent and that said Letters Patent is hereby corrected as shown below:

On the front page, [73], please correct the Assignee from [California Institute of Technology, Pasadena, CA] to Emulex Corporation, Costa Mesa, CA.

Signed and Sealed this

Eighth Day of May, 2001

*Attest:*

NICHOLAS P. GODICI

*Attesting Officer*   *Acting Director of the United States Patent and Trademark Office*